United States Patent
Harter, Jr. et al.

(10) Patent No.: US 7,432,800 B2
(45) Date of Patent: Oct. 7, 2008

(54) ADAPTIVE LIGHTING DISPLAY FOR VEHICLE COLLISION WARNING

(75) Inventors: Joseph E. Harter, Jr., Kokomo, IN (US); Gregory K. Scharenbroch, Kokomo, IN (US); Matthew R. Smith, Westfield, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/886,221

(22) Filed: Jul. 7, 2004

(65) Prior Publication Data

US 2006/0006988 A1 Jan. 12, 2006

(51) Int. Cl.
*B60Q 1/00* (2006.01)

(52) U.S. Cl. .............. 340/436; 340/435; 340/815.42; 701/301

(58) Field of Classification Search .......... 340/903, 340/904, 436, 435, 815.41, 469, 470, 815.42, 340/932.2, 933; 701/301
See application file for complete search history.

(56) References Cited

U.S. PATENT DOCUMENTS

| | | | | | |
|---|---|---|---|---|---|
| 4,528,563 | A | * | 7/1985 | Takeuchi | 340/903 |
| 4,694,295 | A | * | 9/1987 | Miller et al. | 340/903 |
| 4,812,814 | A | * | 3/1989 | Elliott | 340/332 |
| 4,882,565 | A | * | 11/1989 | Gallmeyer | 340/461 |
| 5,313,335 | A | * | 5/1994 | Gray et al. | 359/839 |
| 5,668,539 | A | | 9/1997 | Patchell | 340/903 |
| 5,786,772 | A | * | 7/1998 | Schofield et al. | 340/903 |
| 5,929,786 | A | | 7/1999 | Schofield et al. | |
| 6,198,409 | B1 | * | 3/2001 | Schofield et al. | 340/903 |
| 6,433,679 | B1 | * | 8/2002 | Schmid | 340/435 |
| 6,470,273 | B2 | | 10/2002 | Halsted et al. | 701/301 |
| 6,727,808 | B1 | * | 4/2004 | Uselmann et al. | 340/436 |
| 6,873,250 | B2 | * | 3/2005 | Viana et al. | 340/435 |
| 6,911,642 | B2 | * | 6/2005 | Sartori et al. | 250/208.2 |
| 6,958,683 | B2 | * | 10/2005 | Mills et al. | 340/436 |
| 6,967,569 | B2 | * | 11/2005 | Weber et al. | 340/436 |
| 2002/0011927 | A1 | * | 1/2002 | Lang et al. | 340/436 |
| 2002/0126002 | A1 | | 9/2002 | Patchell | 340/436 |

(Continued)

FOREIGN PATENT DOCUMENTS

DE 38 27 879 8/1989

(Continued)

OTHER PUBLICATIONS

European Search Report, dated Sep. 21, 2005.

*Primary Examiner*—Davetta W. Goins
*Assistant Examiner*—Edny Labbees
(74) *Attorney, Agent, or Firm*—Jimmy L. Funke

(57) ABSTRACT

A warning display system visually warns the driver of a vehicle of an object in a detection zone, such as a blind spot region of the vehicle. The display system includes an imaging medium for displaying a warning indicator and a light source disposed behind the imaging medium for providing a controlled illumination of the warning indicator. An object detection sensor detects an object in a vehicle detection zone. One or more signals are processed to determine an anticipated movement of the vehicle in relation to the object. The system further includes a controller for adaptively controlling illumination of the light source to increase illumination of the warning indicator when the vehicle is anticipated to be moving towards the object.

13 Claims, 3 Drawing Sheets

U.S. PATENT DOCUMENTS

| | | |
|---|---|---|
| 2003/0052773 A1 | 3/2003 | Sjonell |
| 2004/0090317 A1 | 5/2004 | Rothkop |
| 2004/0178892 A1 | 9/2004 | Anderson et al. |
| 2005/0011927 A1* | 1/2005 | McCullough ................ 227/10 |

FOREIGN PATENT DOCUMENTS

| | | |
|---|---|---|
| WO | 95/25322 | 9/1995 |

* cited by examiner

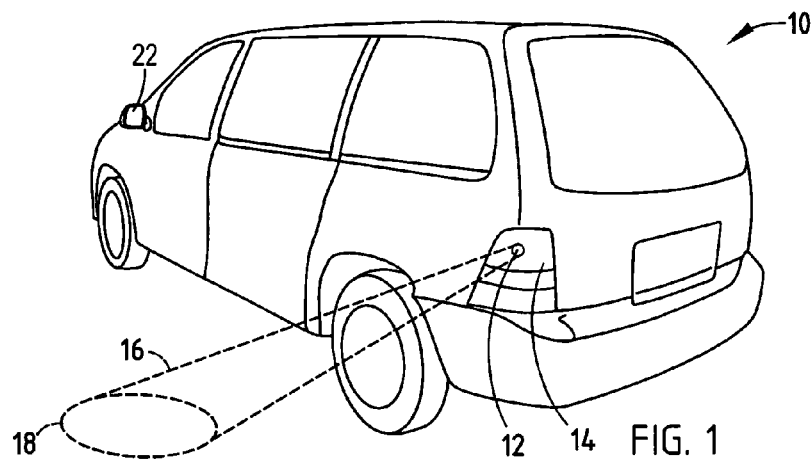
FIG. 1
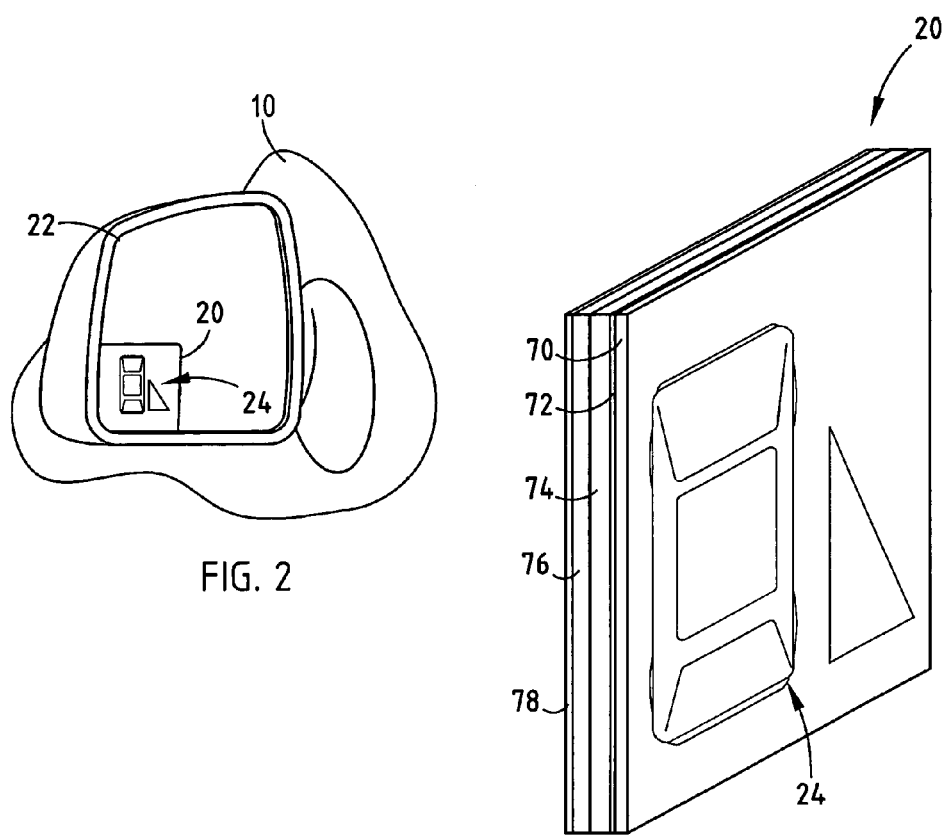
FIG. 2
FIG. 3

ADAPTIVE LIGHTING DISPLAY FOR VEHICLE COLLISION WARNING

TECHNICAL FIELD

Automotive vehicles are increasingly being equipped with collision warning systems that detect and warn the driver of the vehicle of the presence of objects that pose a potential obstruction to the vehicle. Collision warning systems typically include one or more sensors, such as radar sensors, infrared sensors, and imaging sensors (cameras), for sensing the presence of an object in a coverage zone forward or rearward of the host vehicle. In addition to sensing objects forward and rearward of the vehicle, it is desirable to sense objects that may be located proximate the side of the host vehicle, particularly in a blind spot region, to warn the driver of any potential obstructions, especially when changing lanes. While vehicles are typically equipped with side view mirrors for viewing a portion of the side of the host vehicle, it should be appreciated that many vehicles exhibit unviewable regions which are commonly referred to as the blind spot regions.

BACKGROUND OF THE INVENTION

Automotive vehicles are increasingly being equipped with collision warning systems that detect and warn the driver of the vehicle of the presence of objects that pose a potential obstruction to the vehicle. Collision warning systems typically include one or more sensors, such as radar sensors, infrared sensors, and imaging sensors (cameras), for sensing the presence of an object in a coverage zone forward or rearward of the host vehicle. In addition to sensing objects forward and rearward of the vehicle, it is desirable to sense objects that may be located proximate the side of the host vehicle, particularly in a blind spot region, to warn the driver of any potential instructions, especially when changing lanes. While vehicles are typically equipped with side view mirrors for viewing a portion of the side of the host vehicle, it should be appreciated that many vehicles exhibit unviewable regions which are commonly referred to as the blind spot regions.

Detection systems have been proposed for detecting objects in a vehicle blind spot region. Some of the proposed detection systems employ auditory and/or visual warnings to indicate the presence of a detected object in the vehicle blind spot region. For example, when the turn signal in the host vehicle is activated, an auditory or visual warning may be presented to the driver of the vehicle.

Conventional visual warning systems typically include a backlit display for displaying an illuminated warning icon viewable by the host vehicle driver. As vehicles pass in and out of the blind spot region in heavy traffic, the visual icon presented on the display may become overly distractive due to excessive visual activity, which can potentially become annoying to the driver of the host vehicle. The host vehicle driver may tend to ignore the visual icon due to its overly distractive operation.

It is therefore desirable to provide for a vehicle warning system that effectively provides a warning indication to the driver of the vehicle to warn of the presence of an object in a detection zone, such as a blind spot region of the vehicle. It is further desirable to provide for a collision warning system that is not overly distractive and yet effectively presents the warning indication to the driver.

SUMMARY OF THE INVENTION

In accordance with one aspect of the present invention, a warning display system and method are provided to visually warn the driver of a vehicle of an object detected in a detection zone, such as a blind spot region of the vehicle. The display system includes an imaging medium for displaying a warning indicator and a light source for providing a controlled illumination of the warning indicator. The display system also includes a first input for receiving a first signal indicative of detection of an object in a vehicle detection zone and a second input for receiving a second signal indicative of anticipated movement of the vehicle relative to the detected object. The display system further includes a controller for adaptively controlling illumination of the light source to increase illumination of the warning indicator when the vehicle is anticipated to be moving towards the detected object.

According to a further aspect of the present invention, the warning display system is removably detachable to the vehicle. In one embodiment, the vehicle warning display system is equipped with a connector for removably connecting the display to a structure on the vehicle.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which:

FIG. 1 is a perspective side view of a host vehicle employing an object detection and warning display system;

FIG. 2 is an enlarged view of the mirror and warning display shown in FIG. 1, according to one embodiment;

FIG. 3 is an enlarged exploded view of the warning display shown in FIG. 2;

DESCRIPTION OF THE PREFERRED EMBODIMENT

Figure 4:
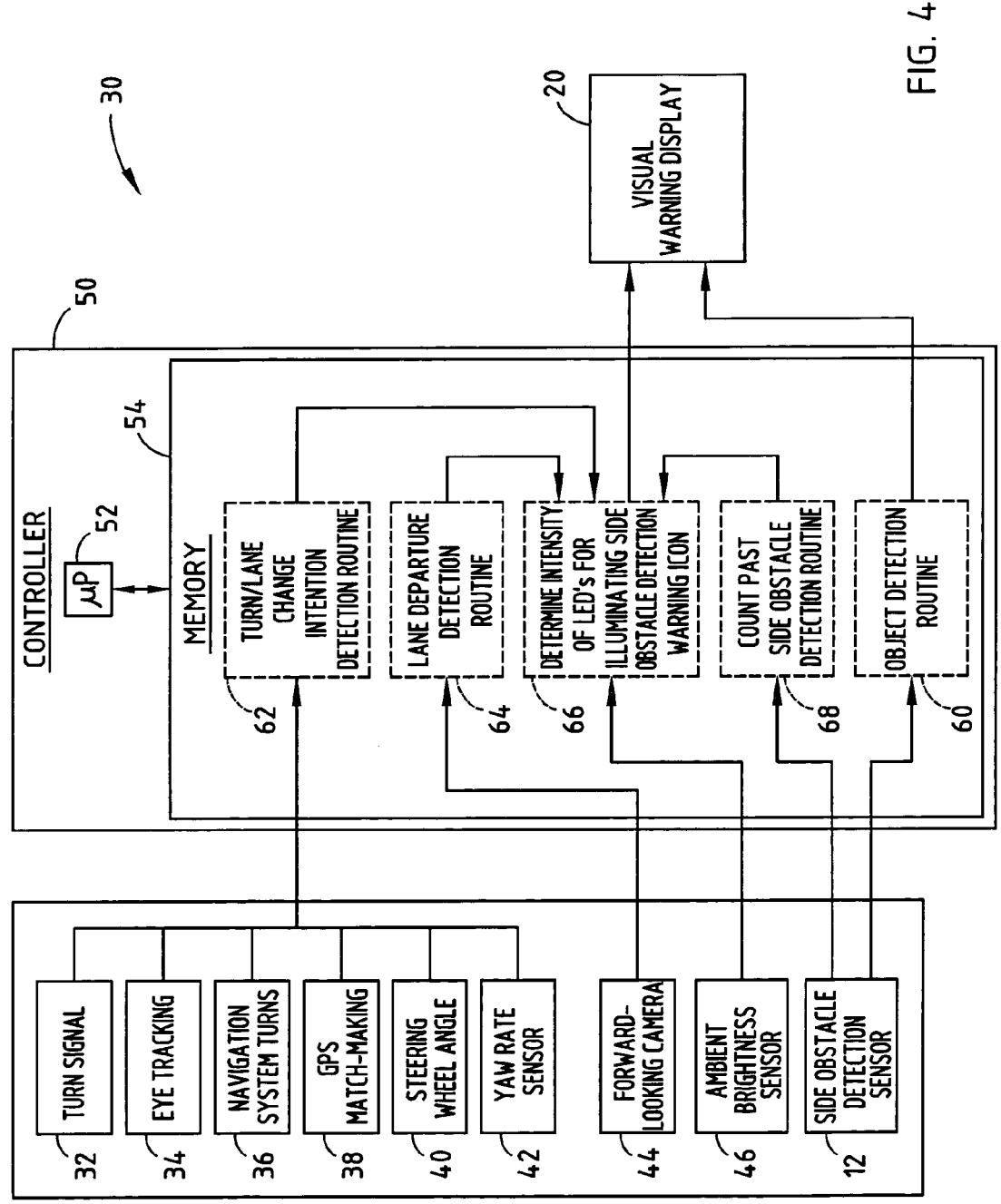
FIG. 4 is a block diagram further illustrating the object detection and warning display system.

Referring to FIGS. 1 and 2, a host vehicle 10, such as an automobile, is generally illustrated equipped with an object detection system and a warning display system displaying an adaptive warning indicator (icon) according to the present invention. In the embodiment shown, the object detection system employs one or more object detection sensor(s) 12 shown located within the rear tail lamp assembly 14 of the host vehicle 10. However, it should be appreciated that the one or more object detection sensor(s) 12 may be located at various other locations onboard the vehicle 10 to sense the presence of an object in one or more coverage zone(s). For example, one or more object detection sensor(s) 12 can be located in a side body panel or the exterior rearview mirror on the host vehicle 10.

The object detection sensor 12 senses the presence of one or more objects in a coverage zone 16. In the embodiment shown, the coverage zone 16 extends onto a target area 18 of the ground surface, such as the roadway. The location, shape, and size of coverage zone 16 may vary.

The object detection sensor 12 may include a thermal detection sensor for detecting thermal energy in the coverage zone 16. According to one embodiment, the sensor 12 may include an infrared (IR) thermal detector employing a thermopile sensor for sensing temperature. One example of the commercially available thermal detector is MLX 90601 infrared thermometer module, which is commercially available from Melexis Microelectronic Integrated Systems. More specifically, the thermal detector may include Model No. MLX 90601 EZA-CAA, commercially available from Melexis Microelectronic Integrated Systems. The aforementioned infrared thermometer module employs a thermopile sensor as the infrared sensing element for recording remote temperature measurements and includes signal conditioning, linearization, and ambient temperature compensation.

The object detection sensor 12 may include one or more active or passive sensors including non-thermal sensing devices. For example, detection sensor 12 may include any of radar sensor(s), ultrasonic sensor(s), and video imaging camera(s) to detect the presence of an object in the detection zone 16.

The host vehicle 10 is shown equipped with an adaptively controllable backlit display 20 for displaying a visual warning icon 24 for viewing by the driver of the host vehicle 10. With particular reference to FIG. 2, the display 20 is shown adhered to a front surface of the driver side exterior rearview mirror 22 according to one embodiment. The display 20 displays a warning icon 24 indicative of an object detected in the coverage zone 16 and presents the warning icon 24 to the driver of the host vehicle 10. The display 20 is adaptively controllable to provide differing levels of light illumination such that the light intensity of the illuminated warning icon 24 is increased when the host vehicle 10 is anticipated to be moving closer to a detected object.

In the embodiment shown in FIG. 2, the backlit display 20 is adhered to the front surface of an exterior rearview mirror 22 on host vehicle 10. The display 20 is therefore easily viewable by the driver of the host vehicle 10. However, it should be appreciated that the display 20 may be otherwise connected to a vehicle structure such as via a bracket assembly. The backlit display may therefore be installed in an aftermarket display then is removably connected to a vehicle structure. It should be appreciated that the display 20 could, alternately, be integrated in a vehicle rearview mirror.

The warning display 20 is shown according to one embodiment in FIG. 3. Display 20 includes a two-way mirrored surface 70 on the front side. The two-way mirrored surface 70 provides reflectivity and further allows light transmission therethrough when a sufficient amount of illumination of the display 20 is present. The display 20 includes a diffuser 74 disposed behind the mirrored surface 70 having an imaging medium 72 configured to provide the warning icon 24 when illuminated from behind. Disposed behind diffuser 74 is a light illumination source 76. One example of backlight illumination source 76 may include one or more light emitting diodes (LEDs). Light illumination source 76 is a backlight source of light illumination that be controllably adjusted to achieve multiple light levels to control the brightness of the displayed warning icon 24. Also shown is adhesive layer 78 for adhering the display 20 to a vehicle structure.

Referring to FIG. 4, the object detection and warning system 30 is generally illustrated having a controller 50 processing a plurality of inputs and providing control signals to the display 20. The controller 50 may include an electronic controller dedicated to object detection and warning, or may include a shared controller, such as a body controller of the host vehicle 10, according to one example. The controller 50 includes a microprocessor 52 and memory 54. The microprocessor 52 may include a conventional microprocessor having the capability for processing algorithms and data. Memory 54 may include read-only memory (ROM), random access memory (RAM), flash memory, and other commercially available volatile and non-volatile memory devices.

Stored within memory 54 and processed by microprocessor 52 are a plurality of routines for processing the plurality of input signals and generating a controlled illumination warning display icon according to the present invention. Included is an object detection routine 60 for detecting the presence of an object in the coverage zone 16. The routines also include a turn/lane change intention detection routine 62 for detecting an intended change of lane by the host vehicle 10. Also, included is a lane departure detection routine 64 for detecting when a vehicle is changing lanes on the underlying roadway. A count past side obstacle detection routine 68 keeps track of the number and frequency of obstacles detected in the detection coverage zone. Also provided is routine 66 for determining intensity of the light illumination (LEDs) source for illuminating the display for adaptively illuminating the warning icon.

The object detection and warning system 30 includes any of a number of inputs for detecting the presence of an object in the detection zone 16 and for sensing parameters which individually, or in combination, may be used to anticipate when the host vehicle 10 is moving closer to a detected object in the detection zone 16. The input signals include a turn signal 32 indicative of the host vehicle turn signal being actuated. The turn signal 32 may be processed to anticipate that the vehicle driver intends to steer the host vehicle 10 toward either side (laterally).

The inputs also include an eye tracking signal 34 indicative of the determined directivity of the eyes of the driver of the host vehicle 10. The eye tracking signal 34 may be generated via one or more cameras located in front of the driver of the host vehicle 10. The eye tracking signal 34 may be employed and an indication that the driver of the host vehicle 10 is not viewing the warning display 20.

Also included as inputs are navigation system turn signals 36 which may include signals generated by a navigation system indicative of the host vehicle 10 changing travel directions (e.g., making a turn). Further included is a global positioning system (GPS) match-making input signal 38 which may also serve as an indication that the host vehicle 10 is changing travel directions.

A steering wheel angle input signal 40 is indicative of the steering angle of the host vehicle 10. The steering wheel angle signal 40 may be used to anticipate a steering maneuver of the host vehicle 10. A yaw rate input sensor 42 is also provided for providing a sensed indication of the yaw rate of the host vehicle 10 which indicates how quickly the host vehicle 10 is turning toward either lateral side.

A forward looking camera input signal 44 may be employed to provide a visual image of the front of the host vehicle 10. The forward looking camera signal 44 may be processed to provide an indication of whether the host vehicle 10 is changing lane. This may be achieved by processing captured images of roadway markings, such as lane divider markings.

The input signals also include an ambient brightness sensor 46 to provide a baseline ambient lighting sense level. The ambient brightness sensor 46 may include a light detection sensor mounted proximate to the front surface of the display 20 to provide an indication of the ambient lighting conditions.

By knowing the ambient lighting conditions at the front of the display 20, the illumination of the display 20 can be adjusted to a suitable level that is viewable by the driver of the host vehicle 10.

The turn/lane change intention detection routine 62 is shown receiving various input signals including the turn signal 32, the eye tracking signal 34, the navigation system turns signal 36, the GPS match-making signal 38, the steering wheel angle signal 40, and the yaw rate sensor signal 42. Each of these input signals 32 through 42 may be processed individually or in combination to determine an anticipated intent to turn or change lanes by the host vehicle 10 which is indicative of an anticipated movement of the host vehicle 10 relative to an object detected in the detection zone 16. Routine 62 may include any of a number of known routines for detecting an anticipated movement of the host vehicle 10 relative to the detected object.

According to one example, routine 62 may determine an anticipated movement of the host vehicle relative to the object based on either the activation of the turn signal 32 in a direction towards a detected object or the steering wheel angle signal 40 exceeding a predetermined threshold angle in the direction toward the detected object. Additionally, the navigation system turns signal 36 and GPS match-making signals 38 may be processed to determine that the host vehicle is anticipated to be moving in a direction towards the sensed object. The various input signals may be processed individually, or in combination, according to any of a number of routines to detect that the host vehicle 10 is anticipated to be moving relative to the detected object.

The lane departure detection routine 64 processes the forward looking camera signal 44 to determine if the host vehicle 10 is changing lanes. By knowing that the host vehicle 10 is changing lanes, controller 50 may anticipate movement of the host vehicle 10 relative to a detected object. This may include processing video images to determine if the host vehicle 10 appears to be changing lanes by processing roadway boundaries and/or lane boundaries, according to one example.

The count past side obstacle detection routine 68 processes the side obstacle detection sensor signal 12 and counts the number of obstacles (objects) detected in the detection zone 16. By counting the number of objects detected, the frequency of objects detected in the detection zone 16 may be tracked and used to control the illumination level of the display 20 to minimize potential distraction caused by presenting an overly significant number of warning icons.

Figures 5, 6:
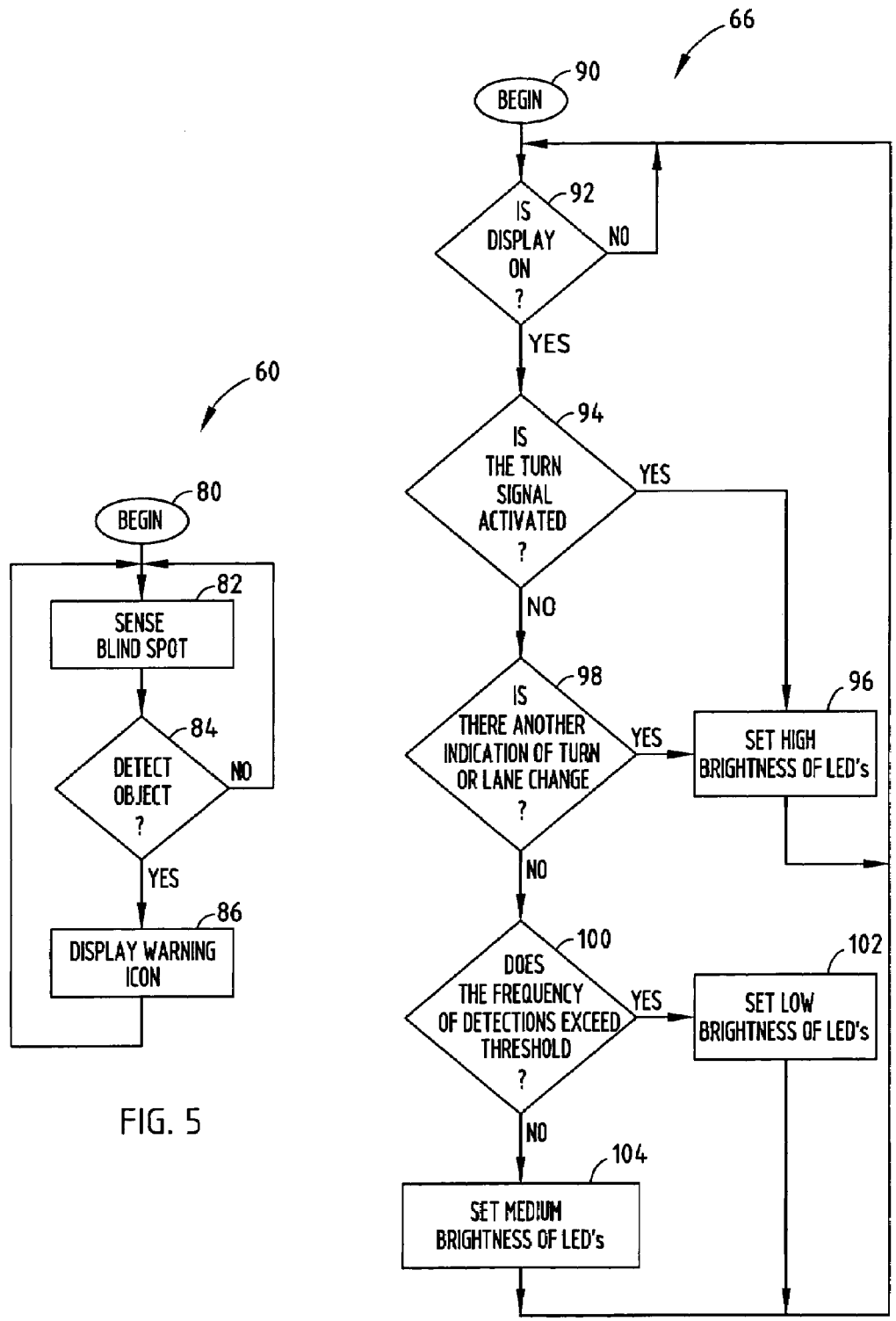
FIG. 5 is a flow diagram illustrating a routine for detecting an object in the vehicle blind spot region.
FIG. 6 is a flow diagram illustrating a routine for adaptively controlling the lighting of the warning display system according to the present invention.

Object detection routine 60 determines the presence of an object in the detection zone 16. This may be achieved by processing one or more object detection signals according to any known technique. One embodiment of object detection routine 60 is shown in FIG. 5. Routine 60 begins at step 80 and proceeds to step 82 to sense the blind spot detection zone 16. This may include monitoring sensed temperature in the coverage zone 16 sensed via a thermal detection sensor 12. Next, routine 60 determines if an object has been detected in decision step 84. Detection of an object may be determined by monitoring the amount of thermal radiation, such as heat emitted from the object(s) in the coverage zone 16. This may include detecting a change in monitored temperature in the coverage zone 16. If an object is detected, routine 60 displays the warning icon 24 on display 20 in step 86 and then continues to sense the blind spot detection zone 16 in step 82. To display the warning icon 24, the display 20 is illuminated via backlighting set to a controlled level of lighting. Otherwise, if no object is detected, routine 60 continues to sense for the presence of an object in the blind spot detection zone 16 in step 82.

It should be appreciated that the controller 50 may process the temperature sensed via sensor 12 and determine the presence of an object emitting thermal radiation in a blind spot region of the vehicle as described in U.S. patent Publication No. 2002/0126002 A1, which is incorporated herein by reference. Any of a number of known techniques may be employed for detecting the presence of an object in the blind spot detection zone 16, without departing from the teachings of the present invention.

Upon detecting the presence of an object in the blind spot detection zone 16 of the host vehicle 10, the controller 50 initiates activation of the display 20 to illuminate the display 20 to present a visual warning icon 24. Referring to FIG. 6, the routine 66 for determining light illumination intensity of the displayed warning icon according to the present invention is shown. Routine 66 begins at step 90 and proceeds to determine if the display is turned on (activated) in decision step 92 and, if not, continues to monitor for the display turned on. The display is turned on whenever an object is detected in the detection zone 16.

If the display is turned on, routine 66 proceeds to decision step 94 to determine if the host vehicle turn signal is activated in a direction toward the detected object, which is indicative that the host vehicle 10 is anticipated to be moving toward the object. If the turn signal is determined to be activated in decision step 94, routine 66 sets the brightness of the backlighting of the display light illumination source to a high setting in step 96 to increase the light intensity (brightness) of the display warning icon. Thereafter, routine 66 will return to decision step 92.

If the turn signal is not activated, routine 66 proceeds to decision step 98 to determine if there is another indication of a turn or lane change of the host vehicle. This may be achieved by employing any of the input signals including the eye tracking signal 34, navigation system turns signal 36, GPS match-making signal 38, steering wheel angle 40, and yaw rate signal 42. If there is another indication of turn or lane change of the host vehicle, routine 66 will set the light illumination source to the high setting in step 96.

If there is no other indication of turn or lane change, routine 66 proceeds to decision step 100 to determine if the frequency of object detections in the detection zone exceeds a threshold. If the frequency of object detections exceeds a threshold, routine 66 will control brightness of the light illumination source to set the light illumination source to a low setting in step 102. By setting the light illumination source to a low setting, routine 66 reduces brightness of the warning icon so that the driver of the vehicle is not distracted by the constant enhanced brightness flicker (on and off activation) of the warning icon in situations when there are repeated detections of objects in the detection zone, such as in heavy traffic conditions on a roadway. If the frequency of detection does not exceed the threshold, routine 66 selects the light illumination source of the display to a medium brightness setting in step 104.

Accordingly, routine 66 advantageously sets the light illumination source of the warning display 20 to a high brightness setting when it is determined that there is an object detected in the detection zone and the host vehicle 10 and detected object are anticipated to be moving toward one another. If the frequency of detections is excessive, routine 60 reduces brightness of the display warning icon 24 to prevent distraction of the driver in heavy traffic conditions. Otherwise, routine 60 maintains the brightness of the light illumination source of the display at a medium setting. The present invention therefore advantageously adjusts brightness of the warning icon 24 displayed on the display 20, and provides a suitable warning indicator to the driver of the host vehicle 10.

According to a second embodiment, the warning display 20 can be attached to a vehicle structure via a bracket assembly which allows for the display 20 to be removably attached to the vehicle 10.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

The invention claimed is:

1. A vehicle blind spot detection and warning system for a vehicle travelling in a designated traffic lane, said system comprising:
    a first detector for detecting the presence of an object in a vehicle blind spot detection zone in an adjacent traffic lane;
    a second detector for detecting whether the vehicle is anticipated to be moving toward an object in the vehicle blind spot detection zone in response to receipt of at least one input from one or more of vehicle navigation, direction control or indicator control systems;
    a warning display carried on a reflective surface of a vehicle sideview mirror for visually alerting a vehicle operator of the detection of an object in the vehicle blind spot detection zone, said warning display comprising a two-way mirror, a diffuser disposed behind said two-way mirror and a variable intensity light source disposed behind said diffuser, said diffuser having an imaging medium configured to define a warning icon; and
    a controller for adaptively controlling illumination of the light source to substantially extinguish said light source in the absence of an object in said detection zone to substantially obscure said warning icon, and to back illuminate said warning icon at a first, fixed intensity, relatively low illumination level in response to a first input from said first detector and to increase back illumination of the warning icon to a second, fixed intensity, relative high illumination level in response to a second input from said second detector when the vehicle is anticipated to be moving toward the object.

2. The system as defined in claim 1, wherein the diffuser, light source, and two-way mirror form a display assembly that is mounted on a vehicle sideview mirror.

3. The system as defined in claim 2, wherein the display assembly is mounted to the vehicle sideview mirror via an adhesive.

4. The system as defined in claim 1, wherein the warning icon is representative of the object in said vehicle detection zone.

5. The system as defined in claim 1, wherein the second detector comprises a steering angle sensor for sensing a signal indicative of a steering angle of a vehicle steering system.

6. The system as defined in claim 1, wherein the second detector comprises a yaw rate sensor for detecting yaw rate of the vehicle.

7. For application in a vehicle traveling in a designated traffic lane, a display system for visually alerting a vehicle operator to both the presence of an object in a vehicle detection zone in an adjacent traffic lane and anticipated departure of said vehicle from said designated traffic lane toward said adjacent traffic lane, said display system comprising:
    a warning display adapted to be carried by said vehicle adjacent a sideview mirror, said warning display including a two-way mirror, a diffuser disposed behind said two-way mirror and a variable intensity light source disposed behind said diffuser, said diffuser having an imaging medium configured to define a warning icon;
    means for detecting an object in said detection zone and generating a first input signal in response thereto;
    means for detecting and anticipating departure of said vehicle from said designated traffic lane and towards said adjacent traffic lane in response to receipt of inputs from one or more of vehicle navigation, direction control or indicator control systems, and generating a second input signal in response thereto; and
    a controller operative to receive said first and second signals, to substantially extinguish said light source in the absence of said first signal to substantially obscure said warning icon, to partially energize said light source for fixed intensity, relatively low level back illumination of said warning icon in response to receiving said first signal and in the absence of said second signal, and to fully energize said light source for fixed intensity, relatively high level back illumination of said warning icon in response to receiving both said first and second signals, whereby said warning icon is selectively viewable by the vehicle operator through said two-way mirror.

8. The display system as defined in claim 7, wherein the imaging medium, light source, and two-way mirror form a display assembly that is mounted on said vehicle sideview mirror.

9. The display system as defined in claim 8, wherein the display assembly is mounted to the vehicle sideview mirror via an adhesive.

10. The display system as defined in claim 7, wherein the warning icon is representative of the object in said vehicle detection zone.

11. The display system as defined in claim 7, wherein the second input receives a signal indicative of a steering angle of a vehicle steering system.

12. The display system as defined in claim 7, wherein the second input receives a signal indicative of yaw rate of the vehicle.

13. A blind spot warning system for a vehicle traveling in a designated traffic lane, said system including a warning display removably attachable to a reflective surface of a vehicle sideview mirror for visually alerting a vehicle operator to the presence of an object in a vehicle detection zone in an adjacent traffic lane, said warning system comprising:
    a warning display adapted to be carried by said vehicle on the outer surface of an associated sideview mirror, said warning display including a two-way mirror, a diffuser disposed behind said two-way mirror and a variable intensity light source disposed behind said diffuser, said diffuser having an imaging medium configured to define a warning icon, said warning display further including an adhesive layer disposed behind said variable intensity light source whereby said two-way mirror is juxtaposed substantially parallel with said vehicle sideview mirror;
    means for detecting an object in said detection zone and generating a first input signal in response thereto;
    means for detecting and anticipating departure of said vehicle from said designated traffic lane and towards said adjacent traffic lane in response to receipt of inputs from one or more of vehicle navigation, direction control or indicator signal systems, with respect to said object and generating a second input signal in response thereto; and a controller operative to receive said first and second signals, to substantially extinguish said light source in the absence of said first signal to substantially obscure said warning icon, to partially energize said light source for fixed intensity, relatively low level back illumination of said warning icon in response to receiving said first signal and in the absence of said second signal, and to fully energize said light source for fixed intensity, relatively high level back illumination of said warning icon in response to receiving both said first and second signals, whereby said warning icon is selectively viewable by the vehicle operator through said two-way mirror.

* * * * *